United States Patent
Stepin et al.

(10) Patent No.: US 11,146,825 B2
(45) Date of Patent: Oct. 12, 2021

(54) FAST BLOCK MATCHING METHOD FOR COLLABORATIVE FILTERING IN LOSSY VIDEO CODECS

(71) Applicant: Huawei Technologies Co., Ltd., Shenzhen (CN)

(72) Inventors: Victor Alexeevich Stepin, Shenzhen (CN); Roman Igorevich Chernyak, Shenzhen (CN); Ruslan Faritovich Mullakhmetov, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/809,179

(22) Filed: Mar. 4, 2020

(65) Prior Publication Data
US 2020/0204829 A1 Jun. 25, 2020

Related U.S. Application Data
(63) Continuation of application No. PCT/RU2017/000645, filed on Sep. 5, 2017.

(51) Int. Cl.
*H04N 19/82* (2014.01)
*H04N 19/176* (2014.01)
*H04N 19/184* (2014.01)

(52) U.S. Cl.
CPC ......... *H04N 19/82* (2014.11); *H04N 19/176* (2014.11); *H04N 19/184* (2014.11)

(58) Field of Classification Search
None
See application file for complete search history.

(56) References Cited

U.S. PATENT DOCUMENTS

| 9,454,806 | B2 | 9/2016 | Pajak et al. |
| 2004/0165663 | A1* | 8/2004 | Hanami ............... H04N 19/543 375/240.16 |

(Continued)

FOREIGN PATENT DOCUMENTS

| WO | 2016165069 A1 | 10/2016 |
| WO | 2017133660 A1 | 8/2017 |
| WO | 2018117896 A1 | 6/2018 |

OTHER PUBLICATIONS

Anna Ukhanova, Simone Milani, Sren Forchhammer, "Game-Theoretic Rate-Distortion-Complexity Optimization for HEVC", 2013 IEEE International Conference on Image Processing (Year: 2013).*

(Continued)

*Primary Examiner* — Xiaolan Xu
(74) *Attorney, Agent, or Firm* — Leydig, Voit & Mayer, Ltd.

(57) ABSTRACT

The present disclosure relates to the search of more than one K-integer best-matching blocks per block within an image, corresponding to best patches for subsequent filtering. In particular, the positions of K best-matching blocks for a template block are found within an image search area, by performing calculations of the similarity between the template block and a test block at all offset positions within a search area. The positions of K or more best-matching blocks for a non-template block are found within an image search area, by performing calculations of the similarity between the non-template block and a test block at all offset positions found as offsets of best-matching blocks for all template blocks.

19 Claims, 9 Drawing Sheets

(56) References Cited

U.S. PATENT DOCUMENTS

| | | | |
|---|---|---|---|
| 2013/0343470 A1 | 12/2013 | Matsumura et al. | |
| 2014/0193094 A1* | 7/2014 | Shin | G06T 5/002 |
| | | | 382/264 |
| 2015/0206285 A1* | 7/2015 | Pajak | G06T 5/002 |
| | | | 382/265 |
| 2016/0205410 A1 | 7/2016 | Lin et al. | |
| 2017/0302929 A1* | 10/2017 | Chen | H04N 19/176 |
| 2018/0255316 A1 | 9/2018 | Zhang et al. | |

OTHER PUBLICATIONS

Ratnottar et al., "Review Towards Fast Block Matching Algorithm for Video Motion Estimation," 2012 International Conference on Communication Systems and Network Technologies, XP032182937, pp. 153-156, Institute of Electrical and Electronics Engineers, New York, New York (May 2012).

Dabov et al., "Image Denoising by Sparse 3-D Transform-Domain Collaborative Filtering," IEEE Transactions on Image Processing, vol. 16, No. 8, pp. 2080-2095, Institute of Electrical and Electronics Engineers, New York, New York (Aug. 2007).

Mahmoudi et al., "Fast Image and Video Denoising via Nonlocal Means of Similar Neighborhoods," IEEE Signal Processing Letters, vol. 12, No. 12, pp. 839-842, Institute of Electrical and Electronics Engineers, New York, New York (Dec. 2005).

Coupe et al., "Fast Non Local Means Denoising for 3D MR Images," MICCAI 2006, LNCS 4191, pp. 33-40 (2006).

Nahhas et al., "Analysis of Block Matching Algorithms with Fast Computational and Winner-update Strategies," International Journal of Signal Processing, Image Processing and Pattern Recognition, vol. 6, No. 3, pp. 129-138 (Jun. 2013).

Tsai et al., "Fast ANN for High-Quality Collaborative Filtering," High Performance Graphics, pp. 1-10, The Eurographics Association (2014).

\* cited by examiner

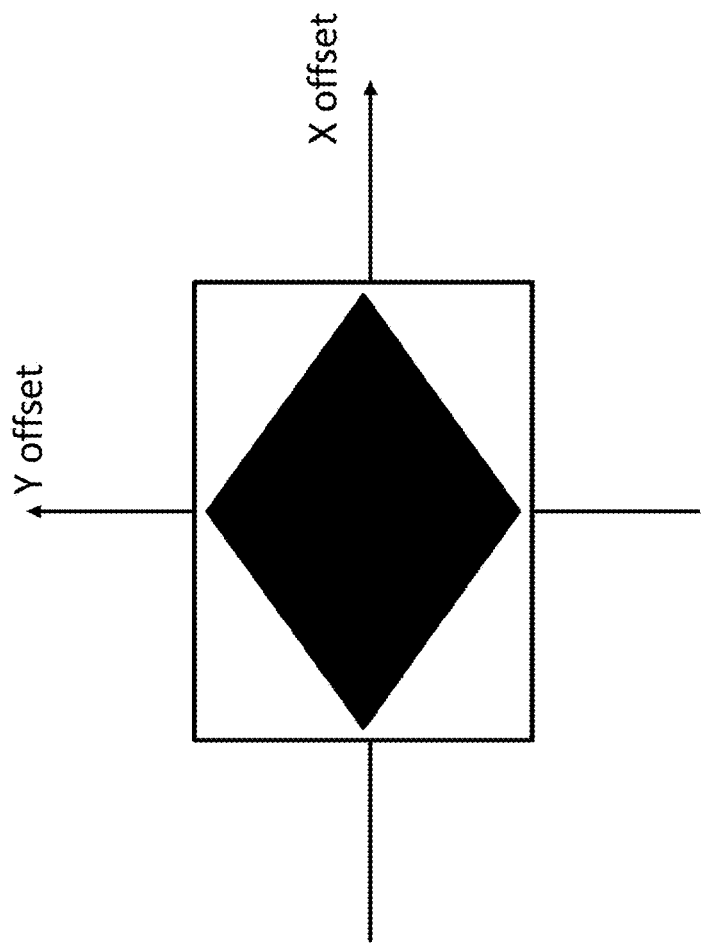
Fig. 7
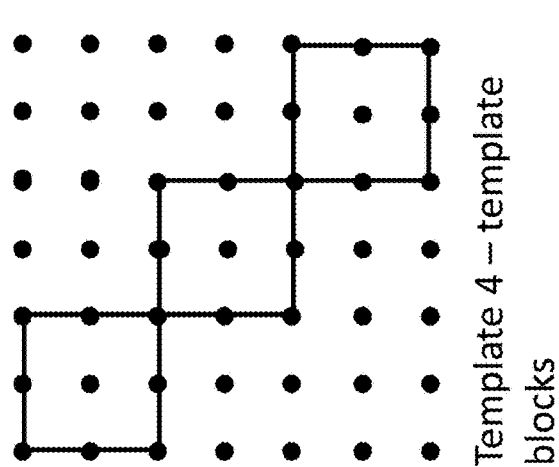
Fig. 6B
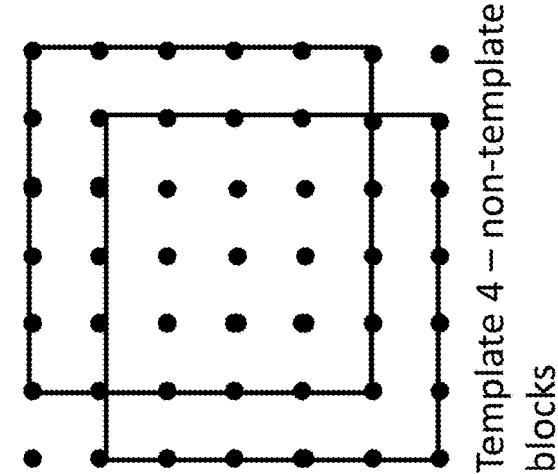

FAST BLOCK MATCHING METHOD FOR COLLABORATIVE FILTERING IN LOSSY VIDEO CODECS

CROSS-REFERENCE TO RELATED APPLICATIONS

This application is a continuation of International Application No. PCT/RU2017/000645, filed on Sep. 5, 2017, the disclosure of which is hereby incorporated by reference in its entirety.

TECHNICAL FIELD

The present disclosure relates to filtering of an image block using a plurality of similar blocks and in particular to a block-matching technique to find the similar blocks.

BACKGROUND

Image filtering is frequently used to emphasize certain features of an image or to enhance the objective or perceptual quality of the filtered image. Image filtering has to deal with various sources of noise. Accordingly, various approaches for quality enhancement have been proposed and are currently in use. These approaches also deal with reducing the amount of transmitted data and its complexity to simplify the data processing and to use the transmission resources most efficiently. One of the powerful tools for image filtering is collaborative filtering. Collaborative filtering has been used for instance as a de-noising filter for still images, as is described in detail by Kostadin Dabov et al. "*Image denoising by sparse 3D transform-domain collaborative filtering*", IEEE Trans. on image processing, vol. 16, no. 8, August 2007. Moreover, application of the collaborative filtering to video coding and decoding has been provided by PCT/RU2016/000920.

In general, collaborative filtering enhances the quality of an image by identifying groups of similar blocks within the image and using them for filtering. Accordingly, an important part of the filtering is the provision for such groups of similar blocks, which is performed typically by block matching. The principle of the block-matching technique, according to prior art, is illustrated in FIG. 1A for a reference block R with a size of N×N image samples (N being an integer larger than one) and up to a predefined maximum block size. Such predefined maximum block size may be given by the standard or pre-configured. For instance, it may be 8×8 or 16×16, or other size. In order to find a block, which matches best the reference block, a search region is defined around the reference block R. In this example, the search region of size M×M is defined, with M being larger than N. The location of the search region here is concentric around the reference block. The search region specifies a set of candidate positions in the image in which the best-matching blocks to the reference block are looked for. Each candidate position can be a fractional pixel position, an integer pixel position or an integer pixel position with skipping a certain number of pixels. Typically, the search region includes M×M samples of the image and each of the sample position of the M×M candidate positions is tested. The test includes calculation of a similarity measure between the N×N reference block R and a block C, located at the tested candidate position of the search region. For its simplicity, the sum of absolute differences (SAD) is a measure frequently used for this purpose and given by:

$$SAD(x, y) = \sum_{i=0}^{N-1} \sum_{j=0}^{N-1} |C_{i,j}(x, y) - R_{i,j}|$$

In the above formula, x and y define the candidate position within the search region. The candidate position is often referred to as block displacement or offset, which reflects the representation of the block matching as shifting of the reference block within the search region and calculating a similarity between the reference block R and the overlapped portion of the search region. In FIG. 1A, the test block C, which may also be referred to as candidate block, is illustrated at the candidate position located in the top portion of the search region. Here, the reference for the position is the bottom left corner of the reference block R: the search space is construed around the center of the reference block R and thus also candidate blocks C are construed as N×N block with its bottom left corner being located at the candidate position within the search region. Indices i and j denote samples within the reference block R and candidate block C. After calculating SAD for all M×M candidate positions x and y, the best matching block C is the block on the position resulting in the lowest SAD, corresponding to the largest similarity with reference block R. Thus, in order to test all candidate positions, i.e., for a full search when all possible M×M offsets inside the search region (also referred to sometimes as search image region, search window or search space) are tested and all pixels inside the N×N reference block are used for the SAD calculation, the number of required operations is proportional N*N*M*M, with "*" denoting multiplication. This complexity of the block matching algorithm is a severe limitation factor of the collaborative filtering usage.

Collaborative filters do not use only one, but in general K best-matching blocks, with K being larger than one. Accordingly, there is a need to provide an efficient search for K best-matching blocks. The larger the search region, the better best-matching blocks may be found. However, the complexity may be limiting factor especially for the real-time applications and specifically for video encoding and decoding applications which may employ collaborative filtering. For the processing of large image frames, this approach results in severe limitations due to a high processing load using large memory space.

A number of pre-selection methods have been proposed to allow block matching complexity reduction, such as U.S. Pat. No. 9,454,806 B2. For pre-selection, certain block features such as average brightness, brightness variance or gradients are calculated for the processed block and the test block and compared. As shown in FIG. 1B, a test block 1 is evaluated for the reference block, but its derived mean value Mean1 leads to discarding test block 1 from block matching. Another test block 2 and its mean value Mean2 fulfils the pre-selection criteria and is used for block matching. If the selected feature shows that both blocks are close to each other, the similarity measure is calculated for the final decision. However, these block features need to be calculated based on all pixels in both blocks, increasing the processing load. In addition, discarding good blocks can occur occasionally, which leads to filter quality degradation for subsequent filtering.

SUMMARY

In view of the above mentioned problems, the present disclosure provides collaborative filtering of a provided area of pixels subdivided into a plurality of reference blocks, based on an efficient search for a predetermined number of best-matching blocks for each reference block.

In particular, the area of pixels, which should be filtered, is subdivided into a number of blocks, of which L non-overlapping blocks are selected as template blocks. Each template block is tested by block matching using test blocks for each offset in the search image region, resulting in the K best-matching blocks. Each non-template block from the same area of pixels is tested by block matching using only the K*L best offsets corresponding to best-matching blocks of the template blocks, resulting in K or more best-matching blocks. The collaborative filtering of each template block and non-template block is performed using its best-matching blocks as patches.

According to an embodiment, an apparatus is provided for filtering each of blocks in a provided area of pixels within an image using for each of the blocks a respective plurality of best-matching blocks found in a search image region. The apparatus comprises a processing circuitry which is configured to: divide the area of pixels, which should be filtered, into a plurality of blocks, including L non-overlapping template blocks and at least one non-template block, L being an integer larger than one. For each of the L template blocks, a predetermined number of best-matching blocks are found by applying block matching within a search image region. A set of best spatial offsets is created from the positions of the best-matching blocks found for all template blocks. For the at least one non-template block, K or more best-matching blocks among blocks with spatial offsets from the set of best spatial offsets found for template blocks are determined. Each of the L template blocks is filtered using the K best-matching blocks and the at least one non-template block is filtered using the found K or more best-matching blocks.

One of the advantages of such filtering is good performance given by the use of a predetermined number of patches and, at the same time, decreased computational complexity achieved by the reduced number of positions tested for the at least one non-template block. This makes said filtering also applicable for video coding and decoding.

According to an example, the area of pixels is a super block of image samples and has a square or rectangular shape. The processing circuitry is configured to subdivide the image or a part of the image into non-overlapped super blocks.

For instance, the template blocks are arranged along one of the diagonals of the super block or along both diagonals of the super block.

The processing circuitry may be further configured to arrange the template blocks within the area of pixels or super block according to direction of an edge within the area of pixels or super block.

While the template blocks are non-overlapping, the at least one non-template block may be overlapping with at least one of the template blocks. In case there is a plurality of non-template blocks, at least two of them may be overlapping as well.

For example, the search image region may have a rectangular shape or a shape of a rhombus. In case the search image region has the shape of a rhombus, the width of the rhombus may be greater than the height of the rhombus.

The processing circuitry may be further configured to determine the location of the search image region within the image for a template block depending on the location of the template block within the image when the L template blocks, the at least one non-template block, and the search image region are located within the same image.

The filter is advantageously configured to perform collaborative filtering, with each of the L template blocks being filtered using the respective found number of best-matching blocks for the template block as patches and the at least one non-template block being filtered using the found K or more best-matching blocks as patches.

According to an embodiment, an apparatus for encoding a video image comprises an image coding circuitry configured to perform video image compression and generating a bitstream including the coded image, an image reconstruction circuitry configured to perform video image reconstruction of the compressed image and the apparatus for filtering of the reconstructed video image.

The apparatus for encoding a video image may further contain an optimization circuitry which in operation performs a rate-complexity-distortion process based on a predefined cost function based on a rate, distortion and number of operations required, resulting in selection of size of the template blocks and/or their arrangement within the block area.

According to another embodiment, an apparatus for decoding a video image from a bitstream is provided, comprising a bitstream parser for extracting from the bitstream portions corresponding to a compressed video image to be decoded, an image reconstruction circuitry configured to perform image reconstruction of the compressed video image and the apparatus for image filtering of the reconstructed video image.

In the decoder, the image may be a video image and the apparatus for image filtering is a post filter, i.e. a filter filtering a video frame reconstructed from the bitstream before outputting (e.g. for displaying) the decoded video frame.

Alternatively, or in addition, the apparatus for image filtering may be employed as an in-loop filter in the encoder and/or the decoder for prediction improvement.

Advantageously, the bitstream includes one or more of the following quantities: an indication of a size and/or a form of the area of pixel, which should be filtered, an indication of a size and/or a form of the search image region, an indication of an arrangement of template blocks within the block area, an indication of the number of best-matching blocks found for template blocks and an indication of the number of best-matching blocks found for non-template blocks.

In accordance with another embodiment, a method is provided for filtering each of blocks in a provided area of pixels within an image using for each of the blocks a respective plurality of best-matching blocks found in a search image region. The method divides the area of pixels, which should be filtered, into a plurality of blocks, including L non-overlapping template blocks and at least one non-template block, L being an integer larger than one. For each of the L template blocks, a predetermined number of best-matching blocks are found by applying block matching within a search image region. A set of best spatial offsets is created from the positions of the best-matching blocks found for all template blocks. For the at least one non-template block, K or more best-matching blocks among blocks with spatial offsets from the set of best spatial offsets found for template blocks for each non-template block are determined. Each of the L template blocks is filtered using the respective found number of best-matching blocks and the at least one non-template block is filtered using the found K or more best-matching blocks.

According to an embodiment, a method for encoding a video image comprises the steps to perform video image compression and generating a bitstream including the coded image, to perform video image reconstruction of the compressed image and to perform filtering of the reconstructed video image.

According to another embodiment, a method for decoding a video image from a bitstream comprises the steps to extract from the bitstream portions corresponding to a compressed video image to be decoded, to perform image reconstruction of the compressed video image and to perform image filtering of the reconstructed video image.

According to an embodiment, a non-transitory computer-readable storage medium is provided storing instructions which when executed by a processor/processing circuitry perform the steps according to any of the above aspects or embodiments or their combinations.

BRIEF DESCRIPTION OF DRAWINGS

In the following, exemplary embodiments are described in more detail with reference to the attached figures and drawings, in which:

FIG. 6B is a schematic drawing, illustrating one exemplary location set of template blocks without overlapping (top) and one exemplary location set of non-template blocks with overlapping (bottom).

FIG. 7 is a schematic drawing illustrating the rectangular search image region (blank) overlaid with an exemplary rhombus-shaped search image region (filled), according to an embodiment of the present invention.

DETAILED DESCRIPTION OF EMBODIMENTS

Figure 1A:
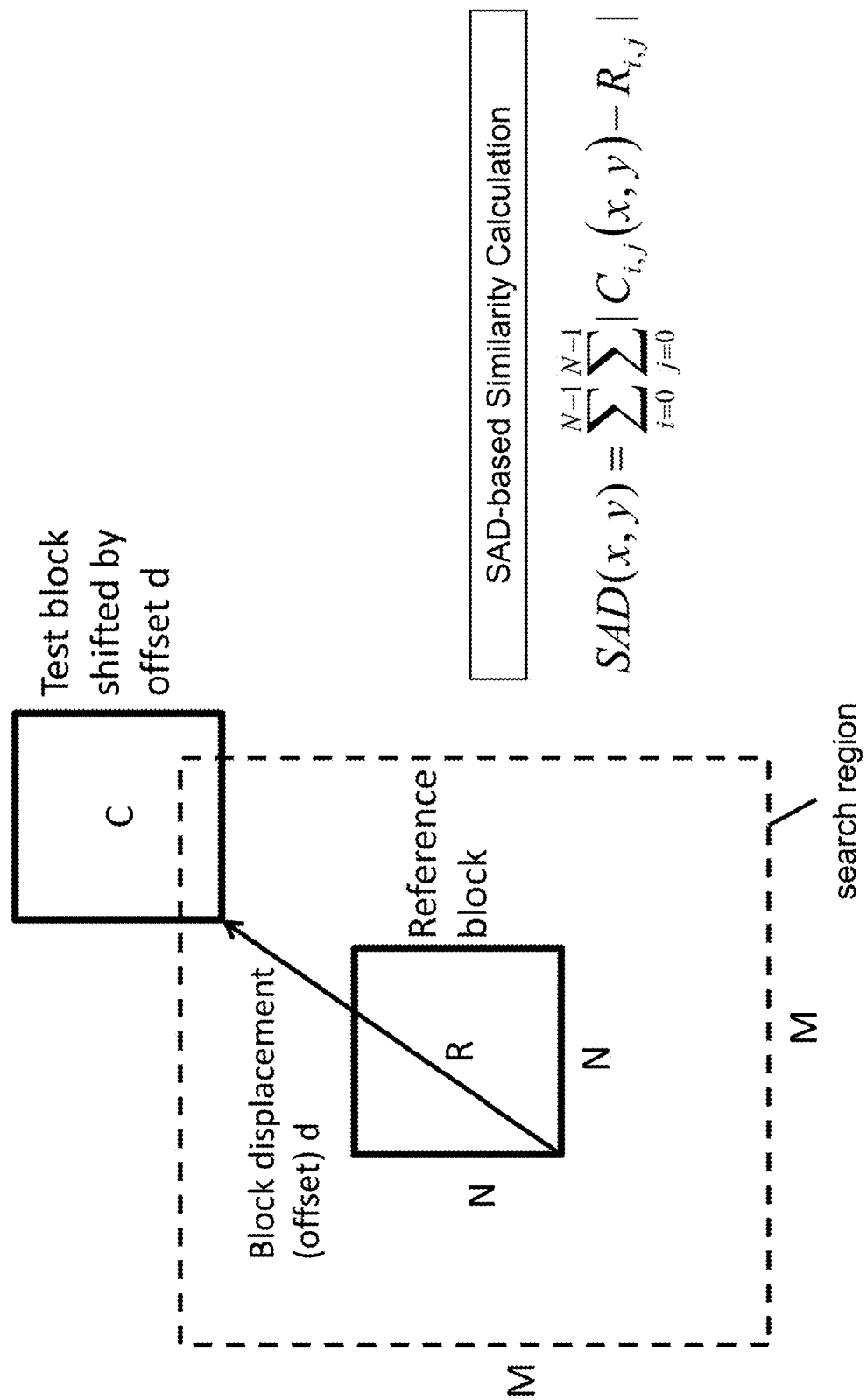
FIG. 1A is a schematic drawing of the block-matching to find a single best-matching block with similarity to a reference block, including the case of a similarity measure based on SAD.

Embodiments of the present invention provide an efficient implementation of block-based filtering to find a predetermined number of best-matching blocks for each filtered block by limiting the number of evaluated test blocks.

In particular, the present disclosure provides a low complexity implementation of a collaborative filter particularly suitable for lossy video codecs. The collaborative filtering may be used as in-loop filtering to filter the predictions signal and/or as a post filtering to filter the signal to be output as the decoded image signal. However, it is noted that the present invention may still be used also for encoding and decoding of still images and not necessarily video images only.

According to an exemplary design, a reconstructed video frame is subdivided into superblocks. The superblocks may be non-overlapping pixel (sample) blocks which may be processed independently from each other as will be described below. In order to reduce complexity of the collaborative filtering, each superblock is further divided into two types of blocks. For a first type of blocks (referred into as template blocks in the following), K best matching blocks are found by performing block matching in a predetermined search region, i.e. by testing all candidate positions of the search region. The location and/or size of the search region may be determined based on the location of the respective block. In particular, the search region for a block may be defined as an area with a certain size around that block. After the K best matching blocks are found for all blocks of the first type included in the superblock, P best matching positions are determined for each respective block of the second type included in the same superblock. The P best matching positions are not determined by the full block matching search over all possible candidate positions within the search region. In order to reduce the complexity, the P best matching blocks for a block of the second type (referred to as non-template block) are searched only among positions of the K already found best matching blocks for all first-type blocks. Blocks of both types are then filtered using the best-matching blocks respectively found for these blocks.

In more detail: each superblock is divided into a set of L smaller template blocks as well as non-template blocks. Advantageously, the template blocks do not overlap, i.e. are disjoint. The more template blocks are present in a superblock, the higher accuracy will be provided for the collaborative filtering since the best matching patches will be found for the template blocks. The less template blocks, the lower will be the complexity. It is noted that the non-template blocks may also be non-overlapping, i.e. disjoint with respect to each other. They may also be disjoint with respect to the template blocks. Such configuration provides low complexity as for any sample region of the superblock, the patches are only searched once. However, in order to further improve the filtering result of the non-template blocks, the non-template blocks may also overlap with each other and/or with the template blocks.

It is noted that the superblock may be subdivided into equally sized blocks which enables for an easy implementation. However, the present invention is not limited thereto and, in general, the blocks may also have different sizes. For instance, the template blocks may be smaller than the non-template blocks in order to further reduce the complexity.

Then each template and non-template block is filtered by the collaborative filter.

The best matching blocks for each template block is found by applying block matching similar as described above with reference to FIG. 1. Instead of one single best matching block, K best matching blocks are found within the search region. In particular, the template block becomes a reference block and a set of candidate positions is tested within the search region. According to this procedure, for each offset (spatial displacement) from the M*M possible offset (position) candidates within a M*M square search image region, a SAD between the template and shifted test blocks is calculated and best K<M*M offset candidates with minimal SAD are selected. These K offset candidates are then used for collaborative filtering of the template block. This is repeated for each of the L template blocks. At the end, there is, for each template block L, a corresponding set of K patches (best matching blocks).

The K offset candidates of the L template blocks are then used to create a set of K*L best spatial offsets. In other words, the union of the L sets each with the K best matching candidates becomes the set of candidates for the non-template blocks. It is noted that the term "spatial offset" or "offset" here is to be understood as a position within the search space. The position is typically defined relatively, but the particular reference for the offset is immaterial for the present invention and represents a mere implementation issue. In particular, the offset/position may be defined within the coordinates of the search space or relatively to the position of the current block (to be filtered) or to the position of the block collocated with the current block but located in a different frame.

For each offset included in the set of best spatial offsets, a SAD between the non-template macro-block and shifted test macro-blocks is calculated and a predetermined number of best offset candidates with minimal SAD are selected. These selected offset candidates are then used for collaborative filtering of the non-template macro-block. The predetermined number of best offset candidates may be K or more best offset candidates, which provides a good achievable coding gain. The overall advantages of the present invention such as complexity reduction are achieved also when the predetermined number is K or when the predetermined number is smaller than K.

The fast block matching method allows to dramatically decrease number of offsets, which should be tested for non-template blocks without any coding gain loss. According to an embodiment of the invention, an apparatus is provided for video coding and for encoding or decoding a frame of a video.

Figure 2:
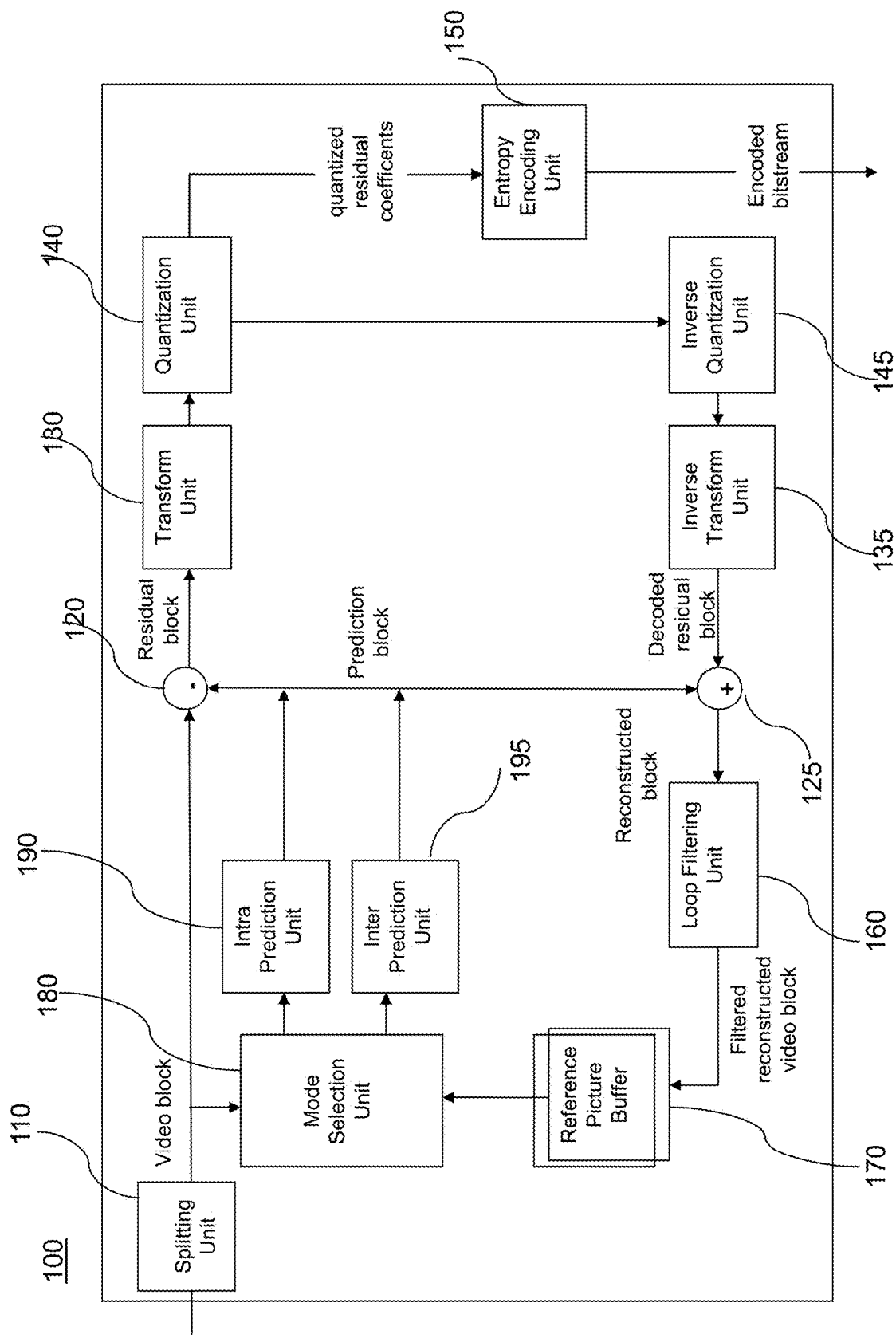
FIG. 2 is a block diagram showing an exemplary structure of a video encoder.

FIG. 2 shows an encoder 100 which comprises an input for receiving input blocks of frames or pictures of a video stream and an output for providing an encoded video bitstream. The term "frame" in this disclosure is used as a synonym for picture. However, it is noted that the present disclosure is also applicable to fields in case interlacing is applied. In general, a picture includes m times n pixels. These correspond to image samples and may each comprise one or more color components. For the sake of simplicity, the following description refers to pixels meaning samples of luminance. However, it is noted that the splitting approach of the present disclosure can be applied to any color component including chrominance or components of a color space such as RGB or the like. On the other hand, it may be beneficial to perform splitting for only one component and to apply the determined splitting to more (or all) remaining components.

The encoder 100 is configured to apply partitioning, prediction, transformation, quantization, and entropy coding to the video stream.

In a splitting unit 110, the input video frame is further split before coding. The blocks to be coded do not necessarily have the same size. One picture may include blocks of different sizes and the block rasters of different pictures of video sequence may also differ. In particular, each video image (picture) is at first subdivided into CTUs of the same fixed size. The CTU size may be fixed and predefined, for instance in a standard. In HEVC, size of 64×64 is used. However, the present disclosure is not limited to standardized and fixed sizes. It may be advantageous to provide a CTU size which may be set at the encoder and provided as a signaling parameter within the bitstream. For instance, different CTU sizes may be beneficial for the respective different picture sizes and/or content types. The CTU size may be signaled on any signaling level, for instance, it may be common for the entire video sequence or for its parts (i.e. a plurality of pictures) or individual per picture. Correspondingly, it may be signaled, for instance within a Picture Parameter Set, PPS or within a Sequence Parameter Set, SPS or within a Video Parameter Set, VPS which are known from the current codecs (H.264/AVC, H.265/HEVC) or similar parameter sets. Alternatively, it may be specified in a slice header or at any other level. The CTU size may take values different from 64×64. It may for instance be 128×128 samples large. In general, in order to perform hierarchic splitting by binary-tree or quad-tree, it may be beneficial to provide CTU size which is a power of two, i.e. in the format of $2^n$ with n being an integer larger than 2.

The subdivision of the chroma CTBs is in HEVC always aligned with that of the respective luma CTBs. It is noted that the present disclosure may handle the chroma components in the same way, but is not limited thereto. There may also be an independent splitting of different color components.

After performing the image splitting in the splitting unit 110, the transformation, quantization, and entropy coding are carried out respectively by a transform unit 130, a quantization unit 140 and an entropy encoding unit 150 so as to generate as an output the encoded video bitstream.

The video stream may include a plurality of frames. The blocks of, for example, the first frame of the video stream are intra coded by means of an intra-prediction unit 190. An intra frame is coded using information from that frame only, so that it can be decoded independently from other frames. An intra frame can thus provide an entry point in the bitstream, e.g., for random access. Blocks of other frames of the video stream may be inter-coded by means of an inter-prediction unit 195: each block of an inter-coded frame is predicted from a block in another frame (reference frame), e.g., a previously coded frame. A mode selection unit 180 is configured to select whether a block of a frame is to be intra predicted or inter predicted, i.e. whether it will be processed by the intra-prediction unit 190 or the inter-prediction unit 195. The mode selection unit 180 also controls the parameters of intra or inter prediction. In order to enable refreshing of the image information, an inter-coded frame may comprise not only inter coded blocks, but also one or more intra coded blocks. Intra frames, in contrast, contain only intra coded and no inter coded blocks. Intra frames may be inserted in the video sequence (e.g., at regularly, that is, each time after a certain number of inter frames) in order to provide entry points for decoding, i.e. points where the decoder can start decoding without using information from preceding frames.

The intra-prediction unit 190 is a block prediction unit. For performing spatial or temporal prediction, the coded blocks may be further processed by an inverse quantization unit 145, and an inverse transform unit 135. After reconstruction of the block by a reconstructor 125 a loop filtering unit 160 may be applied to further improve the quality of the decoded image. The reconstructor 125 adds the decoded residuals to the predictor to obtain reconstructed block. The filtered blocks then form the reference frames that are then stored in a frame buffer 170. Such decoding loop (decoder) at the encoder side provides the advantage of producing reference frames which are the same as the reference pictures reconstructed at the decoder side. Accordingly, the encoder and decoder side operate in a corresponding manner. The term "reconstruction" here refers to obtaining the reconstructed block by adding the decoded residual block to the prediction block.

The inter-prediction unit 195 receives as an input a block of a current frame or picture to be inter coded and one or several reference frames or pictures from the frame buffer 170. Motion estimation and motion compensation are performed by the inter-prediction unit 195. The motion estimation is used to obtain a motion vector and a reference frame, e.g., based on a cost function. The motion compensation then describes a current block of the current frame in terms of the translation of a reference block of the reference frame to the current frame, i.e. by a motion vector. The inter-prediction unit 195 selects a prediction block (i.e. a predictor) for the current block from among a set of candidate blocks (i.e. candidate predictors) in the one or several reference frames such that the prediction block minimizes the cost function. In other words, a candidate block for which the cost function is minimum will be used as the prediction block for the current block.

For instance, the cost function may be a measure of a difference between the current block and the candidate block, i.e. a measure of the residual of the current block with respect to the candidate block. For example, the cost function may be a sum of absolute differences (SAD) between all pixels (samples) of the current block and all pixels of the candidate block in the candidate reference picture. However, in general, any similarity metric may be employed, such as mean square error (MSE) or structural similarity metric (SSIM).

However, the cost function may also be the number of bits that are necessary to code such inter-predicted block and/or distortion resulting from such coding. Thus, a rate-distortion optimization (RDO) procedure may be used to decide on the motion vector selection and/or in general on the encoding parameters such as whether to use inter or intra prediction for a block and with which settings.

The intra-prediction unit 190 receives as an input a block of a current frame or picture to be intra coded and one or several reference samples from an already reconstructed area of the current frame. The intra prediction then describes pixels of a current block of the current frame in terms of a function of reference samples of the current frame. The intra-prediction unit 190 outputs a prediction block for the current block, wherein said prediction block advantageously minimizes the difference between the current block to be coded and its prediction block, i.e. it minimizes the residual block. The minimization of the residual block can be based, e.g., on a rate-distortion optimization procedure. In particular, the prediction block is obtained as a directional interpolation of the reference samples. The direction may be determined by the rate-distortion optimization and/or by calculating a similarity measure as mentioned above in connection with inter-prediction.

The difference between the current block and its prediction, i.e. the residual block, is then transformed by the transform unit 130. The transform coefficients are quantized by the quantization unit 140 and entropy coded by the entropy encoding unit 150. The thus generated encoded video bitstream comprises intra coded blocks and inter coded blocks and the corresponding signaling (such as the mode indication, indication of the motion vector, and/or intra-prediction direction). The transform unit 130 may apply a linear transformation such as a discrete Fourier transformation (DFT) or a discrete cosine transformation (DCT). Such transformation into the spatial frequency domain provides the advantage that the resulting coefficients have typically higher values in the lower frequencies. Thus, after an effective coefficient scanning (such as zig-zag), and quantization, the resulting sequence of values has typically some larger values at the beginning and ends with a run of zeros. This enables further efficient coding. The quantization unit 140 performs a lossy compression by reducing the resolution of the coefficient values. Entropy coding unit 150 then assigns binary codewords to coefficient values. The codewords are written to a bitstream referred to as the encoded bitstream.

Figure 3:
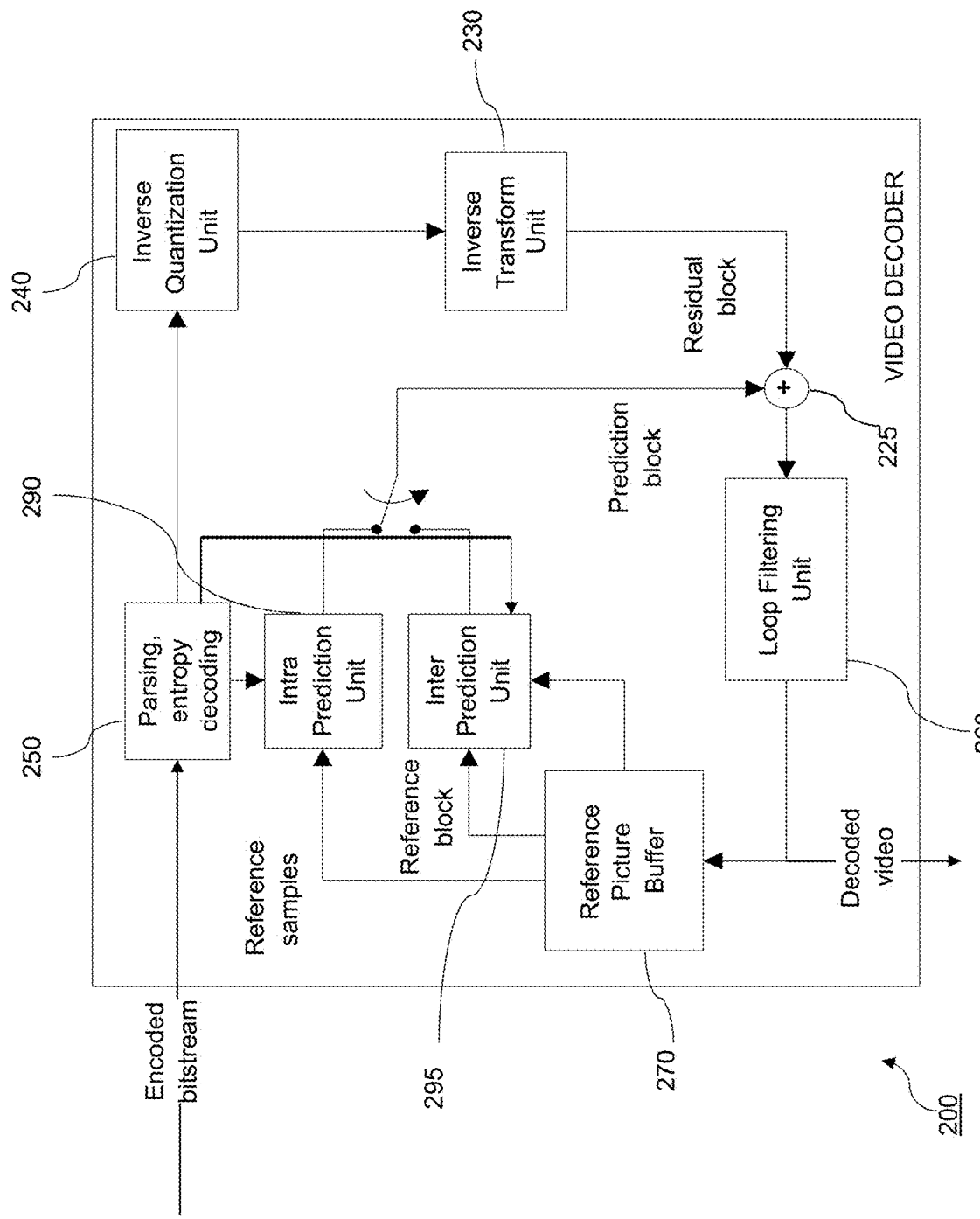
FIG. 3 is a block diagram showing an exemplary structure of a video decoder with an in-loop filtering unit.

FIG. 3 shows an example of a video decoder 200. The video decoder 200 comprises particularly a reference picture buffer 270 and an intra-prediction unit 290, which is a block prediction unit. The reference picture buffer 270 is configured to store at least one reference frame reconstructed from the encoded video bitstream of the encoded video bitstream. The intra-prediction unit 290 is configured to generate a prediction block, which is an estimate of the block to be decoded. The intra-prediction unit 290 is configured to generate this prediction based on reference samples that are obtained from the reference picture buffer 270.

The decoder 200 is configured to decode the encoded video bitstream generated by the video encoder 100, and preferably both the decoder 200 and the encoder 100 generate identical predictions for the respective block to be encoded/decoded. The features of the reference picture buffer 270 and the intra-prediction unit 290 are similar to the features of the reference picture buffer 170 and the intra-prediction unit 190 of FIG. 2.

The video decoder 200 comprises further units that are also present in the video encoder 100 like, e.g., an inverse quantization unit 240, an inverse transform unit 230, and a loop filtering unit 260, which respectively correspond to the inverse quantization unit 140, the inverse transform unit 150, and the loop filtering unit 160 of the video coder 100.

A bitstream parsing and entropy decoding unit 250 is configured to parse and decode the received encoded video bitstream to obtain quantized residual transform coefficients and signaling information. The quantized residual transform coefficients are fed to the inverse quantization unit 240 and an inverse transform unit 230 to generate a residual block. The residual block is added to a prediction block in a reconstructor 225 and the resulting sum is fed to the loop filtering unit 260 to obtain a decoded video block. Frames of the decoded video can be stored in the reference picture buffer 270 and serve as reference frames for inter prediction. The signaling information parsed and decoded from the bitstream may generally include control information related to frame partitioning. In order to further correctly parse and decode the image, the control information is used to recover splitting of the image into coding units in order to correctly assign the following decoded data to the respective coding units.

Generally, the filtering units 160 and 260 of FIGS. 2 and 3 can implement the filtering using best matching blocks as will be described in detail in the following.

The bitstream parsing and entropy decoding unit 250 receives as its input the encoded bitstream. The bitstream may first be parsed, i.e. the signaling parameters and the residuals are extracted from the bitstream. The syntax and semantic of the bitstream may be defined by a standard so that the encoders and decoders may work in an interoperable manner. The signaling parameters may also include some filter settings for the collaborative filter, such as number of patches (K) to be used and/or other settings, as describe further below.

The video coding apparatus performs in particular collaborative filtering of a reconstructed frame, based on multiple similar spatial areas of reconstructed frame(s).

Figure 4:
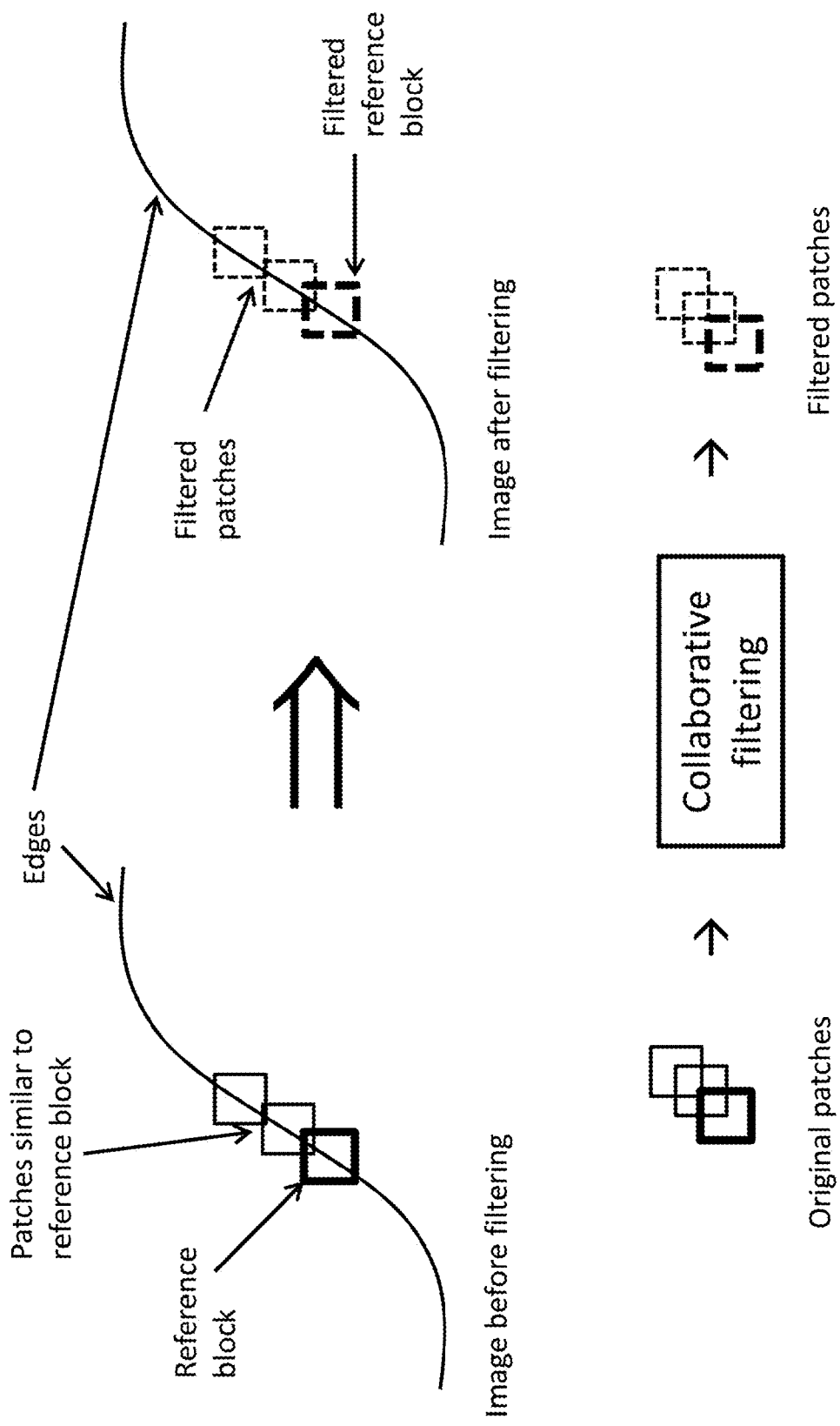
FIG. 4 is a schematic drawing of the location of patches used for collaborative filtering.

FIG. 4 illustrates the principle of the collaborative filtering of an image including an edge, based on a set of image blocks, referred to as original patches. The left part of FIG. 4 shows the image before filtering, along with a set of unfiltered reconstructed blocks. The set of these unfiltered reconstructed blocks consists of the reference block (solid square with thick lines) and a set of neighboring blocks (not necessarily directly neighboring, but rather located in the neighborhood and marked by a solid square with thin lines) around the reference block, having similar spatial image areas (best patches). In the example of FIG. 4, there are two (K=2) of these neighboring blocks with similarity to the reference block. However, before filtering, these best patches around the reference block must be first found within the image (reconstructed frame) or a search image region being a subset of image samples, which is accomplished via a block-matching technique. Once a set of patches is found, the set of the reconstructed blocks similar to the reference block are jointly filtered by use of a collaborative filter, which provides as output both the filtered reconstructed reference block blocks (dashed squares with thick line) and/or its filtered set of best-matching blocks (dashed squares with thin lines).

The present disclosure may be advantageously employed in the coding and decoding of image and/or video and, in particular, to the restricted processing for finding multiple best-matched image blocks for non-template blocks within reconstructed frames, needed in collaborative filtering.

In general, the collaborative in-loop filtering 160, 260 may also be performed on a block basis when coding/decoding the corresponding blocks. However, the collaborative filtering by the encoder and decoder can only start, after a certain number of blocks are reconstructed, so that there are some reconstructed image blocks already, belonging to the same image as the reference block. Thus, in an embodiment, the search for best-matching blocks is performed after a predetermined number of blocks are reconstructed.

Figure 5:
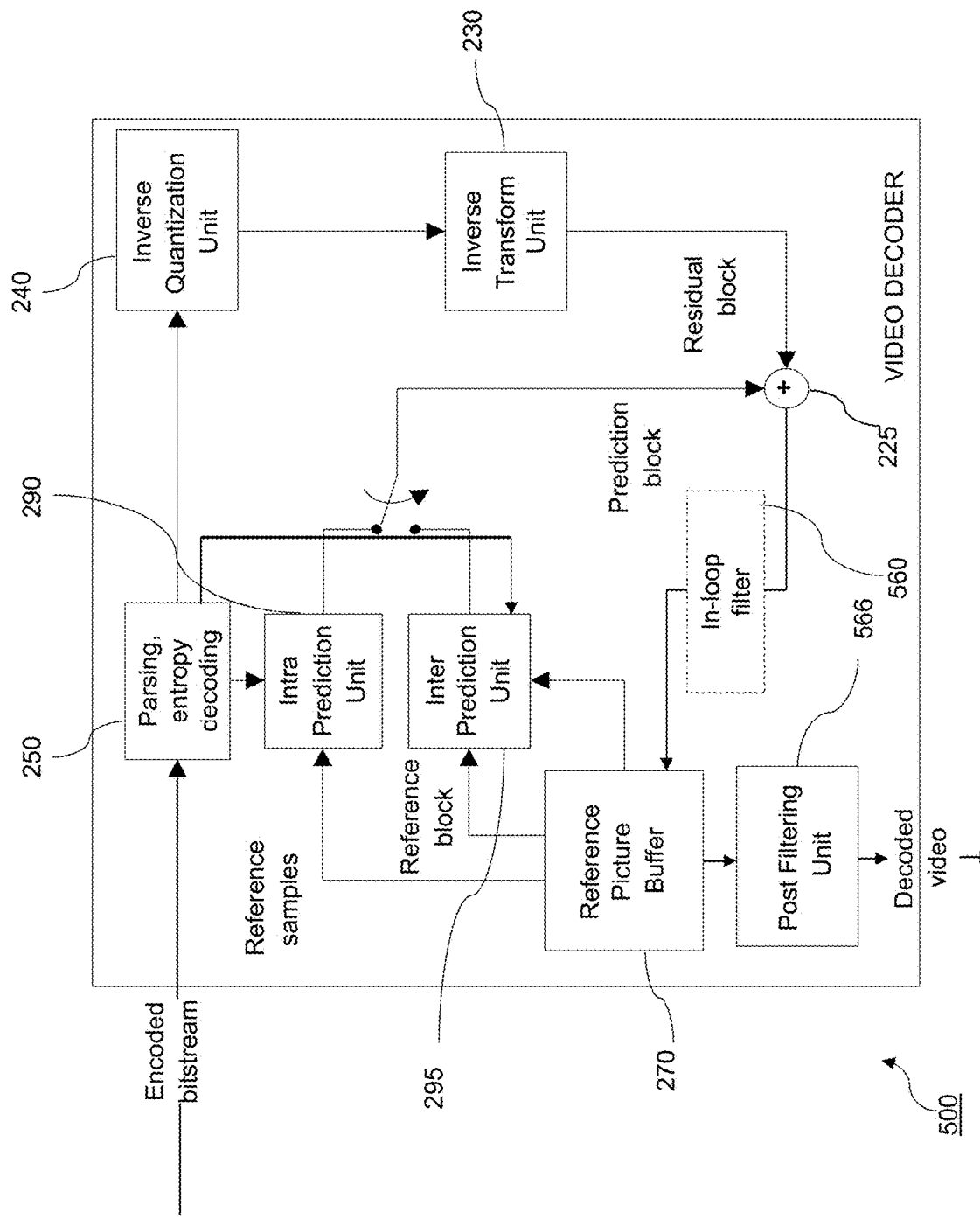
FIG. 5 is a block diagram showing an exemplary structure of a video decoder with a post filtering unit.

FIG. 5 shows a decoder 500 which mainly corresponds to the decoder 200 described with reference to FIG. 3. However, the collaborative filtering (or, in general, any filtering which uses more than one best-matching blocks for the filtering of the filtered block) is employed as post filter 566. Loop-filter 560 does not need to be collaborative filter in this case. It may be any loop-filter such as deblocking filter or any adaptive filter or fractional simple interpolation filter or the like.

Clearly, the provision for the sets of similar blocks impacts the performance of the filter and the computational complexity of the filtering.

The image subdivision may be performed by dividing the image into non-overlapping equally-sized square blocks of a size, for instance 16×16, 8×8 or 4×4 or the like. The size may depend on the image resolution or it may be determined by rate-distortion or rate-distortion-complexity optimization. However, these are only some examples. In general, any other block sizes may be employed and the blocks may also differ in size. For instance, a hierarchic partitioning may also be used. The blocks do not have to be square. They can have sides with different sizes or may even be non-rectangular shaped. Nevertheless, square and rectangular shapes typically provide for simple implementation.

If the filtering is applied as a part of video coding and decoding, the subdivision of the image into reference blocks to be filtered may follow the partitioning of the image for the purpose of coding, i.e. partitioning of the image into the CTUs and CUs as described above. This may be beneficial, since such partitioning usually already reflects the picture character so that smooth image portions have larger blocks and more complex image portions are divided into smaller blocks. However, it is noted that the subdivision of the image into the blocks may also be performed independently of the underlying partitioning for block coding purposes. The subdivision may be configurable, i.e. determined at the encoder by user or the encoder and signaled within the bitstream for the decoder.

Some embodiments of the present invention aims at reducing the processing load and the required memory space without compromising the data quality. The embodiments of the present invention provides for each processed image block included in an image block area a plurality of best matching blocks, which can be used for follow-up filtering, using an advanced block matching approach. The used image may be a still image or a video image.

In general, not each portion of an image or video frame has to be filtered. The image or video frame may be subdivided at first into different areas and some of them may be filtered using the collaborative filtering while the others remain unfiltered or are filtered using a different approach. The decision on whether or not to apply collaborative filtering to a particular image area may be performed based on the image characteristics of the area such as presence of edges, smoothness, characteristics of the surrounding image areas or the like. The image characteristics may also be derived (estimated) based on the coding mode (intra-mode/inter-mode, particular intra-mode, CTU partitioning or the like). For instance, collaborative filtering may be beneficial, if there are edges. The decision on whether or not a collaborative filter is to be applied may also be made according to rate-distortion or rate-distortion-complexity optimization.

After the decision, the filtering of the selected image areas is performed. However, it is noted that the decision process is not to limit the invention and, in general, the filtering may be applied to all blocks. The filtering of an image area (which may correspond to superblock) may be performed by a filtering apparatus described in the following.

The apparatus for filtering each of blocks in the area of pixels (samples) within an image includes processing circuitry, which in operation, performs the following processing. The provided area of pixels, which should be filtered, within an image is divided into blocks. The image area may be a super block having square or rectangular shape. However, the present invention is not limited to such form and, in general, the image area may have also different shapes, in particular, it may be any grouping of the blocks to be filtered.

This set of blocks includes L non-overlapping template blocks and at least one non-template block. The term "template block" refers to a block of a first type which is used for block (i.e. "template") matching. The term "non-template block" refers to a block for which a limited set of candidates rather than the complete block matching is performed.

The blocks may generally have different sizes. On the other hand, it may be advantageous for ease of implementation to have blocks with the same size, i.e. the image area subdivided in a regular block raster. The number L is an integer larger than 1.

The input for the block matching method is the area of pixels to be processed and a search region for block matching. The location of the template blocks may be determined according to the direction of an edge within the area of pixels. The edge may be determined by the intra prediction mode or by other approaches such as the determination of a gradient for instance by Sobel operator or any other operator or a different approach for edge detection.

Figure 6A:
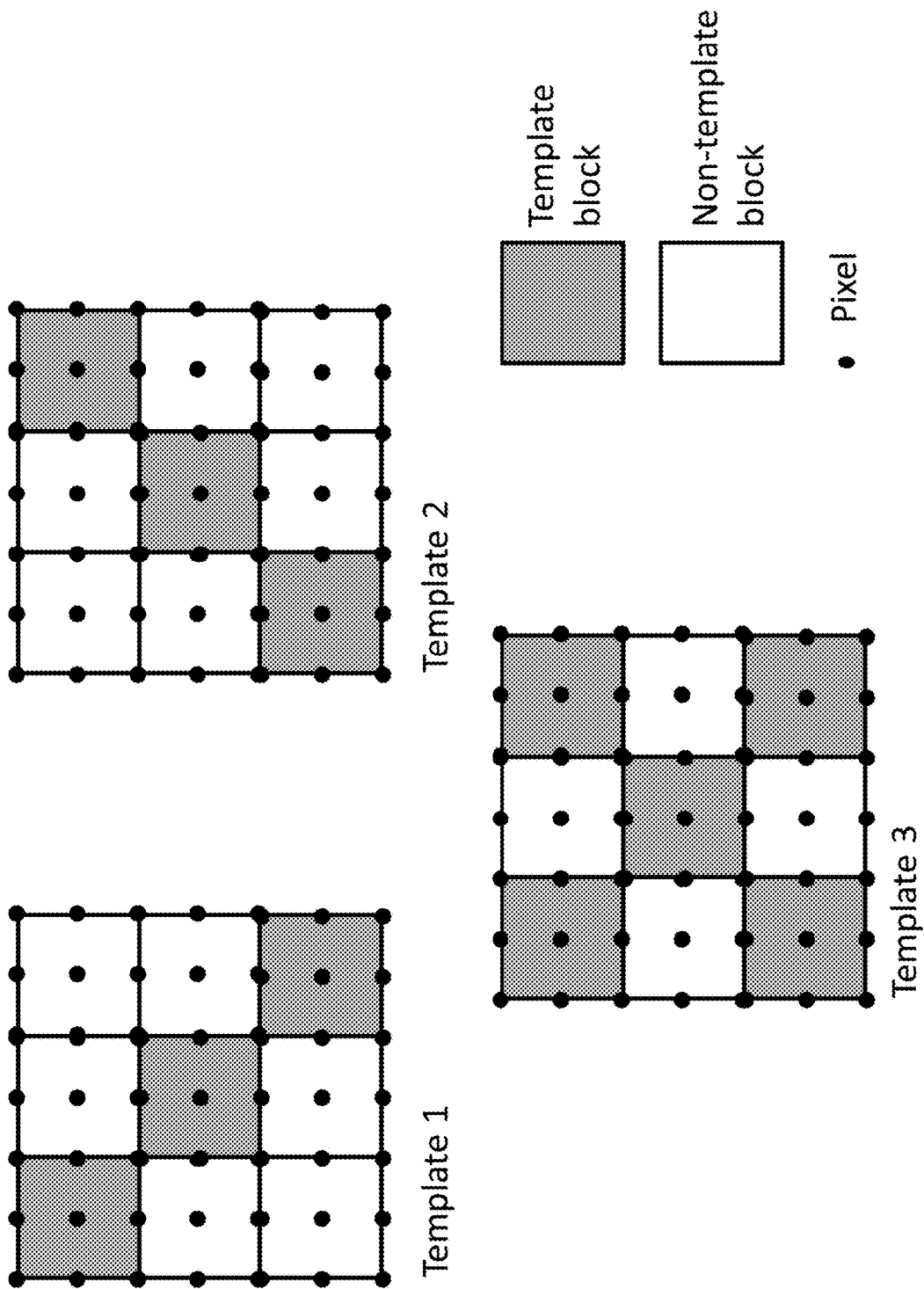
FIG. 6A is a schematic drawing, illustrating three exemplary location sets of template blocks without overlapping.

As non-limiting examples, the template blocks can be arranged along one of the diagonals of the block area or along both diagonals of the block area. These examples are shown in FIG. 6A. The shown block size of 3×3 pixels is only illustrational, as the blocks can have other sizes as well such as 2×2, 4×4, 8×8 or the like; they may also be rectangular but not square, i.e. having one side greater than the other one. The selection of the template blocks (i.e. which of the blocks in the area, e.g. in the superblock, are to be template blocks) may also be performed by selecting of one among a predefined number of possibilities. For instance, there may be three possibilities to select the location of the template blocks corresponding to the template blocks in FIG. 6A: ascending and descending diagonal or both. The selection may be determined by rate-distortion optimization (RDO) or rate-distortion-complexity optimization (RDCO) or based on the presence of edges as mentioned above.

It is noted that the three possible superblock formats shown in FIG. 6A are merely examples. There may be different arrangements of the blocks within a superblock. For instance, not all diagonal blocks have to be template blocks. On the other hand, blocks out of the diagonal may be template blocks. For the sake of reducing the complexity, it is advantageous if the template blocks are non-overlapping. However, it is noted that in theory, they may also overlap.

The non-template blocks may be overlapping with each other and/or with template blocks. This is illustrated in FIG. 6B. FIG. 6B on the top shows template blocks on a pixel grid. The template blocks correspond to one of the configurations of the template blocks from FIG. 6A. However, in FIG. 6B on the bottom it can be seen that the non-template blocks are overlapping. There are two overlapping non-template blocks, which partially overlap with each other and with the template blocks. FIG. 6B is also merely exemplary and in general, a superblock may include overlapping and non-overlapping non-template blocks. Overlapping non-template blocks may provide the advantage of improved coding gain.

The block matching of a template block is performed by testing each position within the search image region assigned for the template block, i.e. using the block matching. The term "testing" here refers to calculating similarity metric and comparing the result with previously calculated results for other positions to determine whether the tested position is better than the other positions and in particular, whether it belongs to the K best positions (corresponding to K best matching blocks for the template block).

The search image region may be located in the same frame as the template block, or in another frame. Its location and size may be predetermined, defined by the user or depending on the block properties.

Figure 1B:
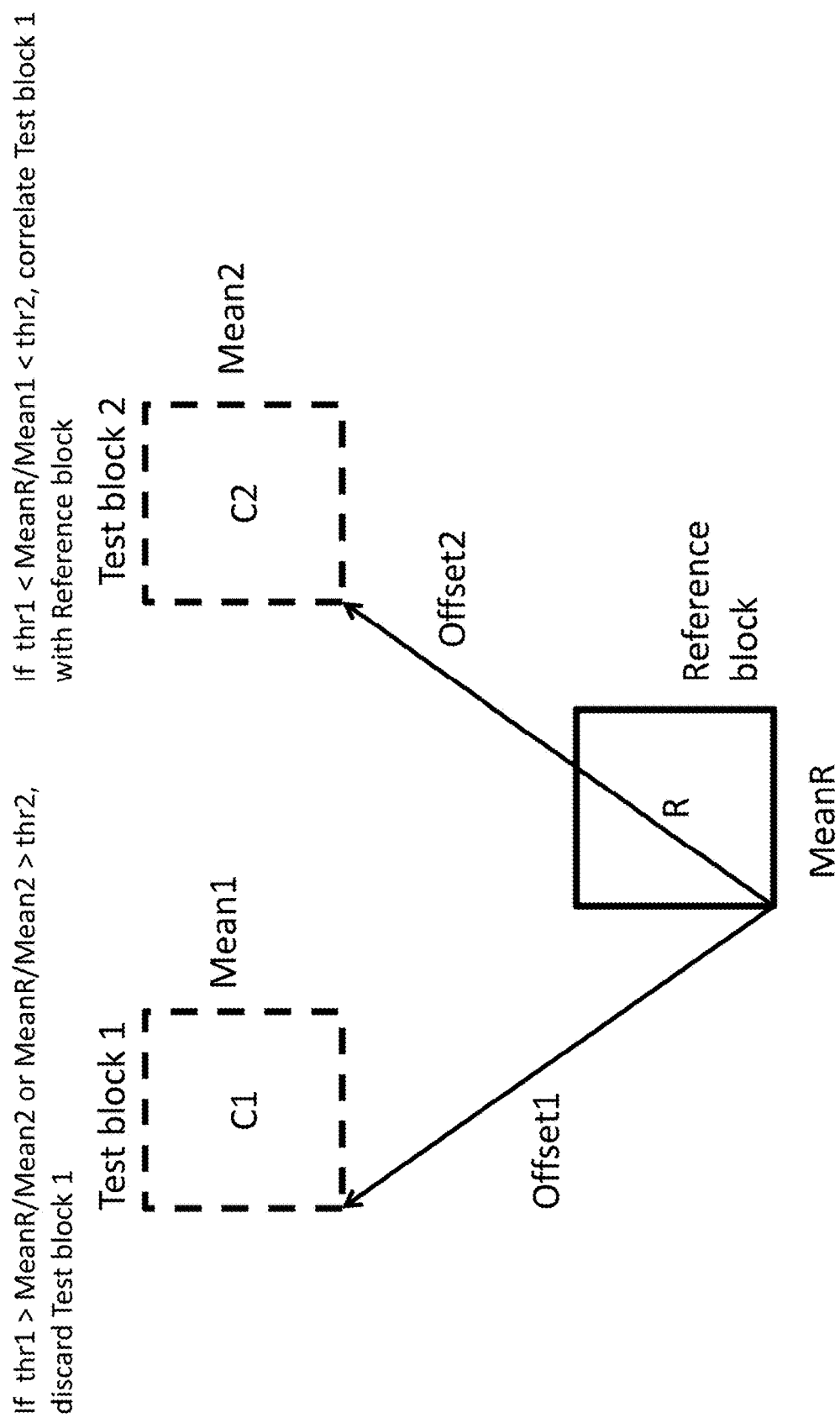
FIG. 1B is a schematic drawing illustrating pre-selection.

In one configuration, the search region is determined as described with reference to FIG. 1 as an area around the reference block, in this case the template block for which the block matching is to be performed. The size of the search region may be predefined or depending on the size of the template block. For instance, the search region for larger template blocks may be larger. It is noted that in case of video coding with the search region being in a frame different from the frame in which the template block is located, the search region location is determined for instance as the entire previously decoded frame or as a region therein located around the block co-located with the template block. It is noted that the block matching may be performed in one or more previously decoded video frames (images). Thus, the present embodiments are particularly relevant for in-loop application in a video encoder/decoder where the patches for the collaborative filter can be found within images different from the image in which the template block is located so that collaborative filtering can be applied during the encoding/decoding also without delay, i.e. without waiting until the entire image in which the template block is located is reconstructed. However, the present embodiments are not limited thereto and the collaborative filtering may also be applied using the best matching blocks from the same image as the template block location image. A combination of both (currently filtered image and previously reconstructed images) may also be used.

When performing the search for the K best patches, for each template block, while performing the block matching only a predetermined number K of best matching offsets with their similarity measures may be stored. The predetermined number K is an integer larger than 1 and may be different for the individual template blocks. To simplify the following description, it is assumed that the predetermined number K is the same for the individual template blocks, which does not have to be the case. Storing only the predetermined number K of best matches may be achieved as follows. At the beginning of processing the template block, a threshold gets assigned a value indicating high dissimilarity. Of the first K processed test blocks, the determined similarity measures and the related offsets are stored. The threshold gets assigned the determined similarity measure value indicating the strongest dissimilarity. For each further processed test block, the derived similarity measure is compared with the threshold. If the derived similarity measure shows stronger similarity than the threshold, the stored entry with the threshold similarity measure is removed, the currently derived similarity measure or the remaining stored similarity measure showing the strongest dissimilarity is assigned as updated threshold value and the derived similarity measure with its offset is stored. If the derived similarity measure shows weaker similarity than the threshold, the currently derived similarity measure with its offset is not stored.

Depending on user settings, parameters of the provided area of pixels or the processed template block, certain pre-selection algorithms may be applied to the template block. Based on the results of this application, only a reduced number of offsets may be tested during block matching of the template block to improve efficiency. Accordingly, pre-selection may only be applied if its processing load is smaller than the processing load reduction caused by the reduced number of offsets, which will be tested subsequently.

Accordingly, after performing block matching of the L template blocks, L sets containing K best matches each, i.e. the best matching offsets with their similarity measures, have been generated. One set of best spatial offsets is generated from the L sets by including all entries of the L sets. Accordingly, the set contains K*L best matches.

Subsequently, the at least one non-template block is processed. Candidate testing of the at least one non-template block is performed by testing only those offsets within its assigned search image region, which are contained in the set of best spatial offsets.

For each non-template block, a set containing the K or more best matching blocks, i.e. the best matching offsets with their similarity measures, is generated by applying the threshold-based approach similar to the processing of the template blocks. This procedure is repeated for all non-template blocks. The at least one non-template block may be overlapping with at least one of the template blocks. In case there are several non-template blocks, at least two non-template blocks can be overlapping.

As a result, for each template block, K best matching test blocks are provided, while for each non-template block K or more best matching test blocks are provided. Accordingly, the amount of required memory is reduced by storing only a limited number of best matches. As for the non-template blocks only a limited number of test blocks are evaluated by block matching, the processing load is reduced as well. Therefore, it allows complexity reduction for collaborative filtering without coding gain loss when applied in lossy image/video codecs.

These best matching test blocks can be used for filtering, for example for collaborative filtering in-lossy video codecs, for intra template matching prediction in lossy video codecs and for image de-noising. It may be used as in-loop collaborative filter for prediction improvement to determine filtered reconstructed frames to be used as reference pictures, as shown in FIGS. 2 and 3, and/or as post filter in FIG. 5 for fully decoded frame improvement to determine filtered output pictures.

The advantage of using multiple best matching blocks is based on enhanced statistics. For instance, they can be used for pixel averaging where an enhanced number of used best matching blocks results in removing statistical differences more efficiently. Accordingly, the output blocks contain a smaller amount of noise. For utilizing this advantage, the multiple blocks need to be a rather similar, i.e. best matching, in order not to introduce artifacts.

So far, the search image region was assumed to be rectangular. As horizontal and vertical edges are dominating in the majority of images, the search image region can get assigned the shape of a rhombus inside the standard rectangular search image region. This is shown in FIG. 7, with the filled rhombus being included in the open rectangular search image region. This is illustrational as the rhombus may be larger or smaller than the rectangular search image region. The diagonals of the rhombus can be parallel to the edges of the standard rectangular search image region or tilted. In this implementation, the width of the rhombus may be greater than the height of the rhombus.

For further processing, the size and form of the block area, the size and form of the search image region, an indication of an arrangement of template blocks within the block area as well as the number of best matching blocks per template block and the number of best matching blocks per non-template block can be provided in the generated bitstream.

The proposed method can be implemented as an apparatus included in an apparatus for encoding or decoding an image, which may be either a still image or a video image.

The general set up of an apparatus for encoding an image according to an embodiment of the present invention is shown in FIG. 2. The encoding apparatus contains an image coding circuitry configured to perform image compression and generation of the bitstream including the coded image. It further contains an image reconstruction circuitry configured to perform image reconstruction of the compressed image. The reconstructed image is further processed by an in-loop collaborative filter 160. Before the filtering, this filtering unit also performs the block matching method as described above to provide the input blocks for the subsequent filtering. After filtering, the filtered reconstructed frames are used as reference images for subsequent inter-prediction and intra-prediction. For further processing, control information including the size and form of the block area, the size and form of the search image region, an indication of an arrangement of template blocks within the block area as well as the number of best matching blocks per template block and the number of best matching blocks per non-template block can be transmitted to the decoding apparatus (not shown in FIG. 2).

An apparatus performing the advanced method for block matching and filtering can be included also in a decoding apparatus. The decoding apparatus can receive control information from the encoding apparatus, which can include the size and form of the block area, the size and form of the search image region, an indication of an arrangement of template blocks within the block area as well as the number of best matching blocks per template block and the number of best matching blocks per non-template block (not shown in FIGS. 2, 3 and 5). These parameters are extracted from the received control information and used as setup parameters for the decoding processing. The decoding apparatus contains an image reconstruction circuitry configured to perform image reconstruction of the compressed image. In a decoding apparatus, the apparatus performing the advanced method for block matching and filtering can be included in two different sections of the image processing. It can either be implemented as an in-loop collaborative filter providing filtered reconstructed frames to be used as reference images for subsequent inter-prediction and intra-prediction, see FIG. 3. Alternatively, it can be implemented as a post filter for decoded frame improvement to determine filtered output pictures as shown in FIG. 5. In either case, the respective filtering unit performs the block matching method as described above first to provide the resulting best matching blocks as input blocks for the subsequent filtering.

Figure 8:
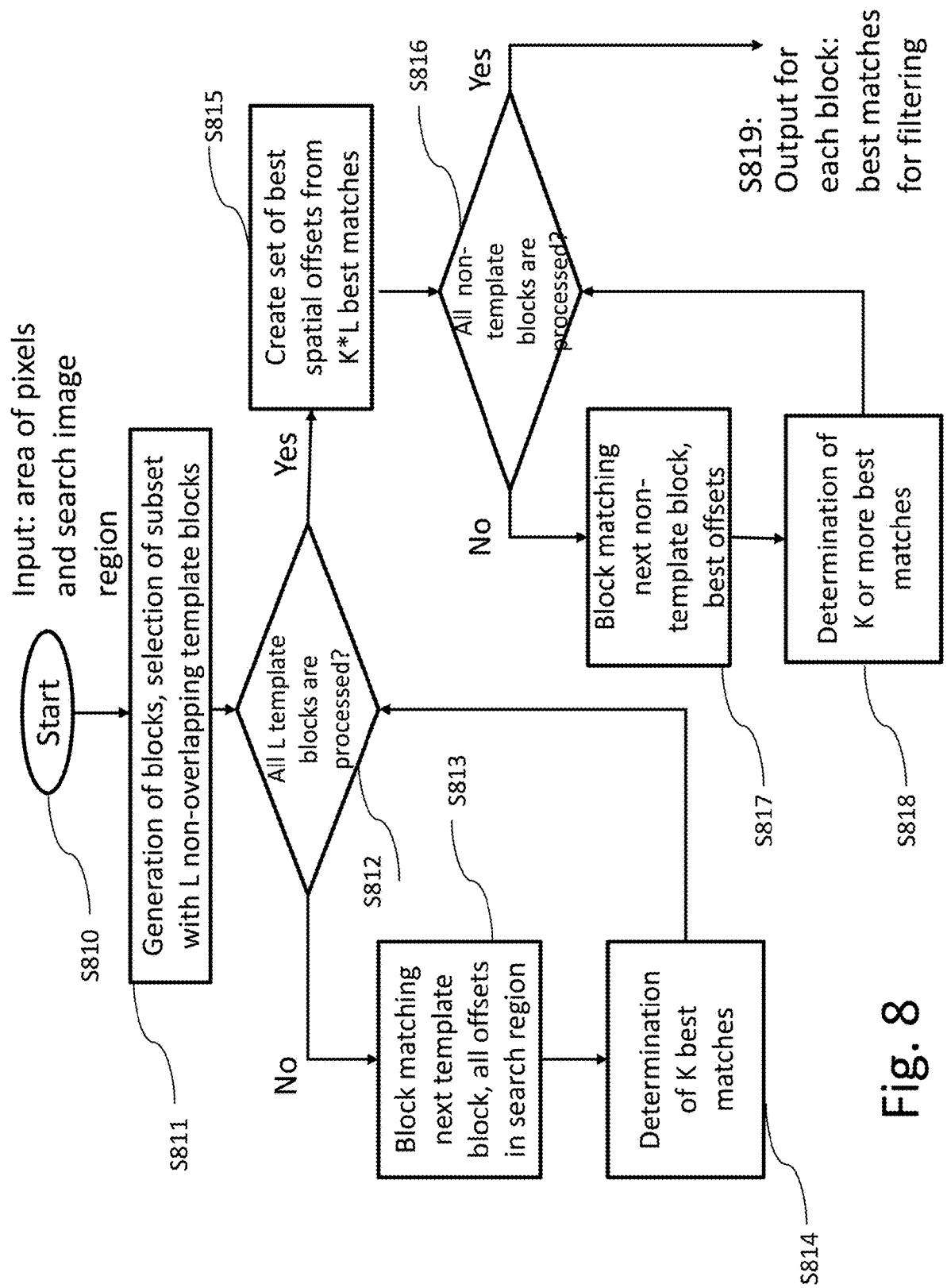
FIG. 8 is a flow diagram, according to an embodiment of the present invention, illustrating the steps of the block-matching procedure to find K best-matching patches per template block and K or more best-matching patches per non-template block.

The processing steps are shown in the flowchart of FIG. 8.

For the processing method, an area of pixels and a search image region are provided as input (Step S810). The provided area of pixels, which may be a super block having square or rectangular shape, within an image is divided into blocks (S811). This set of blocks includes L non-overlapping template blocks and at least one non-template block. The blocks may have different sizes. The number of template blocks L is an integer larger than 1.

The location of the template blocks may be determined by rate-distortion optimization (RDO) or rate-distortion-complexity optimization (RDCO) processes according to the direction of an edge within the area of pixels. The edge may be determined by the intra prediction mode or by other approaches such as the determination of a gradient. As non-limiting examples, the template blocks can be arranged along one of the diagonals of the block area or along both diagonals of the block area. These examples are shown in FIG. 6A. The shown block size of 3×3 pixels is only illustrational, as the blocks can have other sizes as well. The non-template blocks may be overlapping with each other and/or with template blocks as shown in FIG. 6B.

The search image region may be located in the same frame as the area of pixels, or in another frame. Its location and size may be predetermined, defined by the user or depending on the block properties.

As a decision criterion, it is checked whether all L template blocks have been processed already (S812). If the result of decision step S812 is "No", the next template block not yet handled is processed.

Block matching of a template block is performed by testing each position within the search image region assigned for the template block (S813). For a template block, while performing the block matching only a predetermined number K of best matching offsets with their similarity measures are stored (S814). The predetermined number K is an integer larger than 1 and may be different for the individual template blocks. To simplify the following description, it is assumed that the predetermined number K is the same for the individual template blocks, which does not have to be the case. Storing only the predetermined number K of best matches may be achieved as follows. At the beginning of processing the template block, a threshold gets assigned a value indicating high dissimilarity. Of the first K processed test blocks, the determined similarity measures and the related offsets are stored. The threshold gets assigned the determined similarity measure value indicating the strongest dissimilarity. For each further processed test block, the derived similarity measure is compared with the threshold. If the derived similarity measure shows stronger similarity than the threshold, the stored entry with the threshold similarity measure is removed, the currently derived similarity measure or the remaining stored similarity measure showing the strongest dissimilarity is assigned as updated threshold value and the derived similarity measure with its offset is stored. If the derived similarity measure shows weaker similarity than the threshold, the currently derived similarity measure with its offset is not stored.

Block matching of the template blocks continues until all template blocks have been processed. Accordingly, after performing block matching of the L template blocks, L sets containing K best matching blocks each, i.e. the best matching offsets with their similarity measures, have been generated.

Consequently, the result of decision step S812 is "Yes" as all template blocks have been processed.

Based on the results of the template blocks, one set of best spatial offsets is generated from the L sets by including all entries of the L sets (S815). Accordingly, it contains K*L best matches.

As a second decision criterion, it is checked whether all non-template blocks have been processed already (S816). If the result of decision step S816 is "No", the next non-template block of the at least one non-template blocks not yet handled is processed.

Block matching of the processed non-template block is performed by testing only those offsets within its assigned search image region, which are contained in the set of best spatial offsets (S817). For each non-template block, a set containing the K or more best matching blocks, i.e. the best matching offsets with their similarity measures, is generated by applying the threshold-based approach similar to the processing of the template blocks (S818).

Block matching of the non-template blocks continues until all non-template blocks have been processed.

Consequently, the result of decision step S816 is "Yes" as all non-template blocks have been processed.

As a result, for each template block K best matching test blocks are determined, while for each non-template block K or more best matching test blocks are determined. Accordingly, the amount of required memory is reduced by storing only a limited number of best matches. As for the non-template blocks only a limited number of test blocks are evaluated by block matching, the processing load is reduced as well. Therefore, it allows complexity reduction for collaborative filtering without coding gain loss in lossy image/video codecs.

These best matching test blocks are output and can be used for filtering, for example for collaborative filtering in lossy image/video codecs, for intra template matching prediction in lossy image/video codecs and for image denoising.

The present disclosure may be implemented in an apparatus. Such apparatus may be a combination of a software and hardware or may be implemented only in hardware or only in software to be run on a computer or any kind of processing circuitry. For example, the block-matching may be implemented as a primary stage to a filter unit performing collaborative filtering, for example, or, alternatively may be integrated into it, after the reconstruction processing of a video block for further processing of still image or video image coding and decoding. Such kind of processing may be performed by any processing circuitry such as one or more chip (integrated circuit), which may be a general purpose processor, or a digital signal processor (DSP), or a field programmable gate array (FPGA), or the like. However, the present invention is not limited to implementation on a programmable hardware. It may be implemented on an application-specific integrated circuit (ASIC) or by a combination of the above mentioned hardware components.

Summarizing, the present disclosure relates to the search of more than one K-integer best-matching blocks per block within an image, corresponding to best patches for subsequent filtering. In particular, the positions of K best-matching blocks for a template block are found within a search image region, by performing calculations of the similarity between the template block and a test block at all offset positions within a search image region. The positions of K or more best-matching blocks for a non-template block are found within a search image region, by performing calculations of the similarity between the non-template block and a test block at all offset positions found as offsets of best-matching blocks for all template blocks.

What is claimed is:

1. An apparatus for filtering each of a plurality of blocks in an area of pixels within an image using, for each of the plurality of blocks, a respective plurality of best-matching blocks found in a search image region, the apparatus comprising processing circuitry configured to:
   divide the area of pixels into blocks including L non-overlapping template blocks and at least one non-template block, L being an integer larger than one,
   for each of the L template blocks find a predetermined number K of best-matching blocks by applying block matching within the search image region, K being an integer larger than one,
   for each of the L template blocks obtain K best spatial offsets corresponding to the number K of found best-matching blocks,
   for the at least one non-template block find K or more best-matching blocks among blocks with spatial offsets that have spatial offsets closest to the spatial offsets from the K*L best spatial offsets, and
   filter each of the L template blocks using the respective found K best-matching blocks and the at least one non-template block using the found K or more best-matching blocks.

2. The apparatus according to claim 1, wherein
   the area of pixels is a super block of image samples having a square or rectangular shape and
   the processing circuitry is configured to subdivide the image or a part of the image into non-overlapped super blocks.

3. The apparatus according to claim 2, wherein the processing circuitry is further configured to:
   arrange the template blocks along one of two diagonals of the super block or along both of the two diagonals of the super block.

4. The apparatus according to claim 2, wherein the processing circuitry is further configured to:
arrange the template blocks within the area of pixels or within the super block according to a direction of an edge within the area of pixels or within the super block.

5. The apparatus according to claim 2, wherein
the at least one non-template block is overlapping with one or more of the remaining blocks, and/or
the area of pixels or the super block comprises a plurality of non-template blocks of which at least two overlap.

6. The apparatus according to claim 1, wherein the search image region has a shape of a rhombus.

7. The apparatus according to claim 6, wherein a width of the rhombus is greater than a height of the rhombus.

8. The apparatus according to claim 1, wherein
the L template blocks, the at least one non-template block, and the search image region are located within a same image, and
the processing circuitry is configured to determine a location of the search image region within the same image for a template block depending on a location of the template block within the same image.

9. The apparatus according to claim 1, wherein:
the processing circuitry is configured to perform the filtering as collaborative filtering of:
each of the L template blocks by using the K best-matching blocks found for the respective template block as patches, and/or
the at least one non-template block by using the K or more best-matching blocks as patches.

10. An apparatus for encoding a video image, the apparatus comprising:
image coding circuitry configured to perform video image compression and generate a bitstream including a coded image;
image reconstruction circuitry configured to perform video image reconstruction of the coded image to produce a reconstructed video image; and
the apparatus according to claim 9 for filtering of the reconstructed video image.

11. The apparatus according to claim 10, the apparatus further comprising:
optimization circuitry which in operation performs a rate-complexity-distortion process based on a pre-defined cost function based on a rate, distortion and number of operations required, resulting in selection of a size of the template blocks and/or an arrangement of the template blocks within the block area.

12. An apparatus for decoding a video image from a bitstream, the apparatus comprising:
a bitstream parser configured to extract from the bitstream portions corresponding to a coded video image to be decoded;
image reconstruction circuitry configured to perform image reconstruction of the coded video image to produce a reconstructed video image; and
the apparatus according to claim 9 for filtering of the reconstructed video image.

13. The apparatus according to claim 12, wherein the apparatus for filtering is a post filter for decoded frame improvement.

14. The apparatus according to claim 11, wherein the apparatus is an in-loop filter for prediction improvement.

15. The apparatus according to claim 10, wherein the processing circuitry is configured to:
determine that the bitstream includes one or more of:
an indication of a size and/or a form of a block region,
an indication of a size and/or a form of the search image region,
an indication of an arrangement of template blocks within a block area,
an indication of the number of best-matching blocks found for template blocks, and
an indication of the number of best-matching blocks found for non-template blocks.

16. A method for filtering each of a plurality of blocks in an area of pixels or a super block within an image using, for each of the plurality of blocks, a respective plurality of best-matching blocks found in a search image region, the method comprising the steps of:
dividing the area of pixels or the super block into blocks including L non-overlapping template blocks and at least one non-template block, L being an integer larger than one,
for each of the L template blocks finding a predetermined number K of best-matching blocks by applying block matching within the search image region, K being an integer larger than one,
for each of the L template blocks obtaining K best spatial offsets corresponding to the number K of found best-matching blocks,
for the at least one non-template block finding K or more best-matching blocks among blocks with spatial offsets that have spatial offsets closest to the spatial offsets from the K*L best spatial offsets, and
filtering each of the L template blocks using the found K best-matching blocks and the at least one non-template block using the found K or more best-matching blocks.

17. A method for encoding a video image comprising the steps of:
performing video image compression and generating a bitstream including a coded video image;
performing video image reconstruction of the coded video image to produce a reconstructed video image; and
video image filtering of the reconstructed video image according to the method of claim 16.

18. A method for decoding a video image from a bitstream comprising the steps of:
extracting from the bitstream portions corresponding to a compressed video image to be decoded;
performing video image reconstruction of the coded video image to produce a reconstructed video image; and
video image filtering of the reconstructed video image according to the method of claim 16.

19. A non-transitory computer-readable medium storing a program including instructions which, when executed on a processor perform the steps of the method according to claim 16.

* * * * *